(12) United States Patent
Luo et al.

(10) Patent No.: US 8,374,109 B2
(45) Date of Patent: Feb. 12, 2013

(54) METHODS OF SENDING CONTROL INFORMATION FOR USERS SHARING THE SAME RESOURCE

(75) Inventors: Tao Luo, San Diego, CA (US); Juan Montojo, San Diego, CA (US); Peter Gaal, San Diego, CA (US); Sandip Sarkar, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 12/412,190

(22) Filed: Mar. 26, 2009

(65) Prior Publication Data

US 2009/0279500 A1 Nov. 12, 2009

Related U.S. Application Data

(60) Provisional application No. 61/040,057, filed on Mar. 27, 2008, provisional application No. 61/040,216, filed on Mar. 28, 2008.

(51) Int. Cl.
*H04B 7/00* (2006.01)
(52) U.S. Cl. .................................................... 370/310
(58) Field of Classification Search ........... 370/310–340
See application file for complete search history.

(56) References Cited

U.S. PATENT DOCUMENTS

| 7,522,072 | B1* | 4/2009 | Wu | 341/50 |
| 2004/0213214 | A1* | 10/2004 | Jung et al. | 370/352 |
| 2004/0214602 | A1 | 10/2004 | Aoyama | |
| 2007/0211620 | A1 | 9/2007 | McBeath et al. | |
| 2007/0223422 | A1 | 9/2007 | Kim et al. | |
| 2007/0230406 | A1* | 10/2007 | Kim et al. | 370/335 |
| 2007/0230412 | A1 | 10/2007 | McBeath et al. | |
| 2008/0031191 | A1* | 2/2008 | Kashima et al. | 370/329 |
| 2009/0073908 | A1* | 3/2009 | Cai | 370/312 |
| 2009/0257385 | A1* | 10/2009 | Meylan et al. | 370/329 |

FOREIGN PATENT DOCUMENTS

| JP | 2004023260 A | 1/2004 |
| JP | 2004531137 A | 10/2004 |
| WO | WO02093296 A2 | 11/2002 |
| WO | WO2006043712 A1 | 4/2006 |
| WO | WO2006105333 A1 | 10/2006 |
| WO | WO2007119148 | 10/2007 |
| WO | WO2007148710 A1 | 12/2007 |
| WO | WO2008023646 A1 | 2/2008 |
| WO | WO2008024788 | 2/2008 |
| WO | WO2009026018 | 2/2009 |

OTHER PUBLICATIONS

Ericsson, "Update of uplink reference-signal hopping, downlink reference signals, scrambling sequences, DwPTS/UpPTS lengths for TDD and control channel processing" 3GPP TSG-RAN WG1 Meeting #52, R1-081155, Sorrento, Italy, Feb. 11-15, 2008.

(Continued)

*Primary Examiner* — Chi Pham
*Assistant Examiner* — Fan Ng
(74) *Attorney, Agent, or Firm* — Liem T. Do

(57) ABSTRACT

Certain aspects of the present disclosure relate to a method for sending control information to multiple user terminals that share the same resources in a Spatial Division Multiple Access (SDMA) wireless system. The control information can be transmitted from an access point over a physical downlink control channel (PDCCH) that is common for a plurality of user terminals. The overall PDCCH overhead can thus be reduced due to a smaller number of required PDCCH in the SDMA wireless system.

36 Claims, 8 Drawing Sheets

OTHER PUBLICATIONS

Interdigital Communications et al: "Downlink Control Signaling for MU-MIMO" 3GPP Draft; RI-081386, 3rd Generation Partnership Project (3GPP), Mobile Competence Centre ; 650, Route Des Lucioles ; F-06921 Sophia-Antipolis Cedex; France, vol. RAN WGI, no. Shenzhen, China; 20080331, Mar. 26, 2008, XP050109806 the whole document.

International Search Report & Written Opinion—PCT/US2009/038676, International Search Authority—European Patent Office—Oct. 21, 2009.

Mitsubishi Electric: "Blind detection complexity reduction with UE specific PDCCH scrambling" 3GPP Draft; RI-080405, 3rd Generation Partnership Project (3GPP), Mobile Competence Centre ; 650, Route Des Lucioles ; F-06921 Sophia-Antipolis Cedex ; France, vol. RAN WG1, no. Sevilla, Spain; 20080109, Jan. 9, 2008, XP050108924 [retrieved on Jan. 9, 2008] the whole document.

Mitsubishi Electric: "UE specific PDCCH scrambling for blind detection complexity reduction" 3GPP Draft; RI-080850, 3rd Generation Partnership Project (3GPP), Mobile Competence Centre ; 650, Route Des Lucioles ; F-06921 Sophia-Antipolis Cedex ; France, v o l . RAN WG1, no. Sorrento, Italy; 20080206, Feb. 5, 2008, XP050109330 [retrieved on Feb. 6, 2008] p. 1.

Motorola: 3GPP TSG RAN1#50 RI-073373 "Search Space Definition for L1/L2 Control Channels " SGPP TSG RANI #50,[Online] vol. RI-073373, No. 50, Aug. 20, 2007, pp. 1-11, XP002512720 Retrieved from the Internet: URL:http://www.3gpp.org/ftp/tsgran/WGI_RL1/TSGR1_50/Docs/RI-073373.zip>[retrieved on Jan. 29, 2009] the whole document.

Qualcomm Europe: "Remaining issues on PDCCH formats and contents" 3GPP Draft; RI-081479, 3rd Generation Partnership Project (SGPP), Mobile Competence Centre ; 650, Route Des Lucioles ; F-06921 Sophia-Antipolis Cedex; France, vol. RAN WGI, no. Shenzhen, China; 20080331, Mar. 26, 2008, XP050109896 the whole document.

* cited by examiner

METHODS OF SENDING CONTROL INFORMATION FOR USERS SHARING THE SAME RESOURCE

CLAIM OF PRIORITY UNDER 35 U.S.C. §119

This application claims benefit of U.S. Provisional Patent Application Ser. No. 61/040,057 filed Mar. 27, 2008 and U.S. Provisional Patent Application Ser. No. 61/040,216 filed Mar. 28, 2008, and assigned to the assignee hereof and hereby expressly incorporated by reference herein.

BACKGROUND

1. Field

Certain aspects of the present disclosure generally relate to wireless communication and, more particularly, to a method for sending control information to multiple user terminals that share the same resource.

2. Background

In order to address the issue of increasing bandwidth requirements demanded for wireless communication systems, different schemes are being developed to allow multiple user terminals to communicate with a single access point by sharing the same channel (same time and frequency resources) while achieving high data throughputs. Spatial Division Multiple Access (SDMA) represents one such approach that has recently emerged as a popular technique for the next generation communication systems. SDMA techniques are adopted in several emerging wireless communications standards such as Institute of Electrical and Electronic Engineers (IEEE) 802.11 and Long Term Evolution (LTE).

In SDMA systems, an access point can transmit or receive different signals to or from a plurality of user terminals at the same time and using the same bandwidth. In order to achieve reliable data communications, signals dedicated to different user terminals need to be located in sufficiently different directions. Independent signals may be simultaneously transmitted from each of multiple space-separated antennas located at the access point. Consequently, the combined transmissions are mutually directional; i.e., the signal that is dedicated for each user terminal is relatively strong in the direction of that particular user terminal, and sufficiently weak in directions of other user terminals. Similarly, the access point simultaneously receives on the same frequency the combined signals from multiple user terminals through each of multiple antennas separated in space, and the combined received signals from the multiple antennas can be split into independent signals transmitted from each user terminal by applying the appropriate signal processing techniques.

A multi-antenna communication system employs multiple transmit antennas at a transmitting entity and one or more receive antennas at a receiving entity for data transmission. The multi-antenna communication system can thus be a multiple-input multiple-output (MIMO) system. The MIMO system employs multiple ($N_t$) transmit antennas and multiple ($N_r$) receive antennas for data transmission. In a multiple-access MIMO system based on the SDMA technique, an access point can communicate with one or more user terminals at any given moment. If the access point communicates with a single user terminal, then the $N_t$ transmit antennas are associated with one transmitting entity (either the access point or the user terminal), and the $N_r$ receive antennas are associated with one receiving entity (either the user terminal or the access point). The access point can also simultaneously communicate with multiple user terminals via SDMA. In general, for SDMA, the access point utilizes multiple antennas for data transmission and reception, and each of the user terminals typically utilize less than the number of access point antennas for data transmission and reception.

In the SDMA wireless system, the access point can send traffic data and control information on the downlink to a user terminal. The control information is typically sent on control channels and may convey a downlink assignment, an uplink assignment, and/or other useful information for the user terminal. For example, the information conveyed by a physical downlink control channel (PDCCH) can include: a resource blocks (RB) assignment, a transmit power control (TPC) command for a physical uplink control channel (PUCCH), a hybrid automatic repeat-request (HARQ) process number, a HARQ swap flag, precoding information, precoding confirmation, modulation and coding scheme, a new data indicator, and a redundancy version.

In the current Evolved UMTS (Universal Mobile Telecommunications System) Terrestrial Radio Access (E-UTRA) specification, six different downlink control information formats can be defined: format 0 dedicated for Uplink Shared Channel (UL-SCH) assignments, format 1 dedicated for Downlink Shared Channel (DL-SCH) assignments for single-input multiple-output (SIMO) systems, format 1A representing a compact DL-SCH format, format 2 dedicated for DL-SCH assignments for MIMO systems, format 3 dedicated for group Transmit Power Control (TPC) with 2-bit adjustments, and format 3A dedicated for group TPC with single-bit adjustments.

For both uplink and downlink operations of the SDMA system, a number of required physical downlink control channels (PDCCHs) equals to a number of user terminals that share the same resources. Since the resource allocations for user terminals in the SDMA system are identical, certain benefits may be achieved if all user terminals that share same resources employ only one PDCCH. The reduced number of required PDCCH further decreases the overall PDCCH overhead in the SDMA system.

SUMMARY

Certain aspects of the present disclosure provide a method for wireless communications. The method generally includes dividing a plurality of user terminals into at least one group of user terminals that share a common spatial division multiple access (SDMA) physical downlink control channel (PDCCH), defining an SDMA Identification (ID) for each user terminal in the group, and transmitting a message comprising control information for at least two of the user terminals in the group over the common PDCCH, wherein the at least two user terminals are identified by their SDMA ID.

Certain aspects of the present disclosure provide a method for wireless communications. The method generally includes receiving a control message over a spatial division multiple access (SDMA) physical downlink control channel (PDCCH) shared by a group of user terminals, wherein the control message comprises control information for at least two of the user terminals in the group identified by SDMA Identifications (IDs), determining if the control message comprises control information for the user terminal, ignoring the message, if the control message does not comprise control information for the user terminal, and extracting the control information from the message, if the control message comprises control information for the user terminal.

Certain aspects of the present disclosure provide an apparatus for wireless communications. The apparatus generally includes a device for dividing a plurality of user terminals into at least one group of user terminals that share a common spatial division multiple access (SDMA) physical downlink control channel (PDCCH), a device for defining an SDMA Identification (ID) for each user terminal in the group, and a transmitter for transmitting a message comprising control information for at least two of the user terminals in the group over the common PDCCH, wherein the at least two user terminals are identified by their SDMA ID.

Certain aspects of the present disclosure provide an apparatus for wireless communications. The apparatus generally includes a receiver for receiving a control message over a spatial division multiple access (SDMA) physical downlink control channel (PDCCH) shared by a group of user terminals, wherein the control message comprises control information for at least two of the user terminals in the group identified by SDMA Identifications (IDs), a device for determining if the control message comprises control information for the user terminal, a circuit for ignoring the message, if the control message does not comprise control information for the user terminal; and an extractor for extracting the control information from the message, if the control message comprises control information for the user terminal.

Certain aspects of the present disclosure provide an apparatus for wireless communications. The apparatus generally includes means for dividing a plurality of user terminals into at least one group of user terminals that share a common spatial division multiple access (SDMA) physical downlink control channel (PDCCH), means for defining an SDMA Identification (ID) for each user terminal in the group, and means for transmitting a message comprising control information for at least two of the user terminals in the group over the common PDCCH, wherein the at least two user terminals are identified by their SDMA ID.

Certain aspects of the present disclosure provide an apparatus for wireless communications. The apparatus generally includes means for receiving a control message over a spatial division multiple access (SDMA) physical downlink control channel (PDCCH) shared by a group of user terminals, wherein the control message comprises control information for at least two of the user terminals in the group identified by SDMA Identifications (IDs), means for determining if the control message comprises control information for the user terminal, means for ignoring the message, if the control message does not comprise control information for the user terminal; and means for extracting the control information from the message, if the control message comprises control information for the user terminal.

Certain aspects of the present disclosure provide a computer-program product for wireless communications. The computer-program product includes a computer-readable medium encoded with instructions executable to divide a plurality of user terminals into at least one group of user terminals that share a common spatial division multiple access (SDMA) physical downlink control channel (PDCCH), define an SDMA Identification (ID) for each user terminal in the group, and transmit a message comprising control information for at least two of the user terminals in the group over the common PDCCH, wherein the at least two user terminals are identified by their SDMA ID.

Certain aspects of the present disclosure provide a computer-program product for wireless communications. The computer-program product includes a computer-readable medium encoded with instructions executable to receive a control message over a spatial division multiple access (SDMA) physical downlink control channel (PDCCH) shared by a group of user terminals, wherein the control message comprises control information for at least two of the user terminals in the group identified by SDMA Identifications (IDs), determine if the control message comprises control information for the user terminal, ignore the message, if the control message does not comprise control information for the user terminal, and extract the control information from the message, if the control message comprises control information for the user terminal.

Certain aspects of the present disclosure provide a base station. The base station generally includes at least one antenna, a device for dividing a plurality of user terminals into at least one group of user terminals that share a common spatial division multiple access (SDMA) physical downlink control channel (PDCCH), a device for defining an SDMA Identification (ID) for each user terminal in the group, and a transmitter for transmitting via the at least one antenna a message comprising control information for at least two of the user terminals in the group over the common PDCCH, wherein the at least two user terminals are identified by their SDMA ID.

Certain aspects of the present disclosure provide a mobile handset. The mobile handset generally includes at least one antenna, a receiver for receiving via the at least one antenna a control message over a spatial division multiple access (SDMA) physical downlink control channel (PDCCH) shared by a group of user terminals, wherein the control message comprises control information for at least two of the user terminals in the group identified by SDMA Identifications (IDs), a device for determining if the control message comprises control information for the user terminal, a circuit for ignoring the message, if the control message does not comprise control information for the user terminal, and an extractor for extracting the control information from the message, if the control message comprises control information for the user terminal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
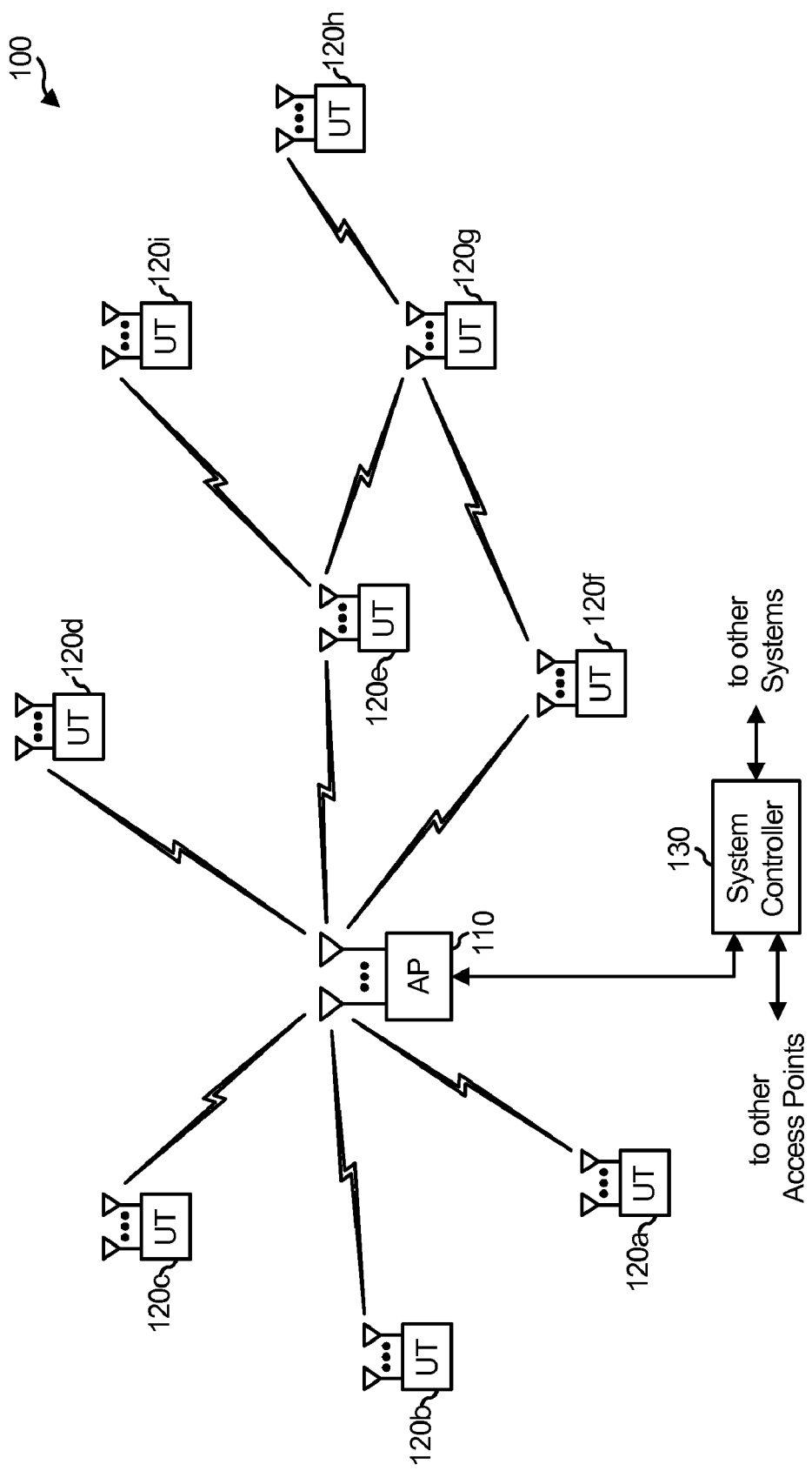
FIG. 1 illustrates a multiple-input multiple-output (MIMO) system with one access point and a plurality of multi-antenna user terminals in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope and spirit of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 Oct. 2005" in October 2005 for mobile BWA systems. The latest revision of the IEEE 802.16, "IEEE P802.16Rev2/D8 Dec. 2008", a draft standard, now consolidates materials from IEEE 802.16e and corrigendum. The standards define four different physical layers (PHYs) and one medium access control (MAC) layer. The OFDM and OFDMA physical layer of the four physical layers are the most popular in the fixed and mobile BWA areas respectively.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
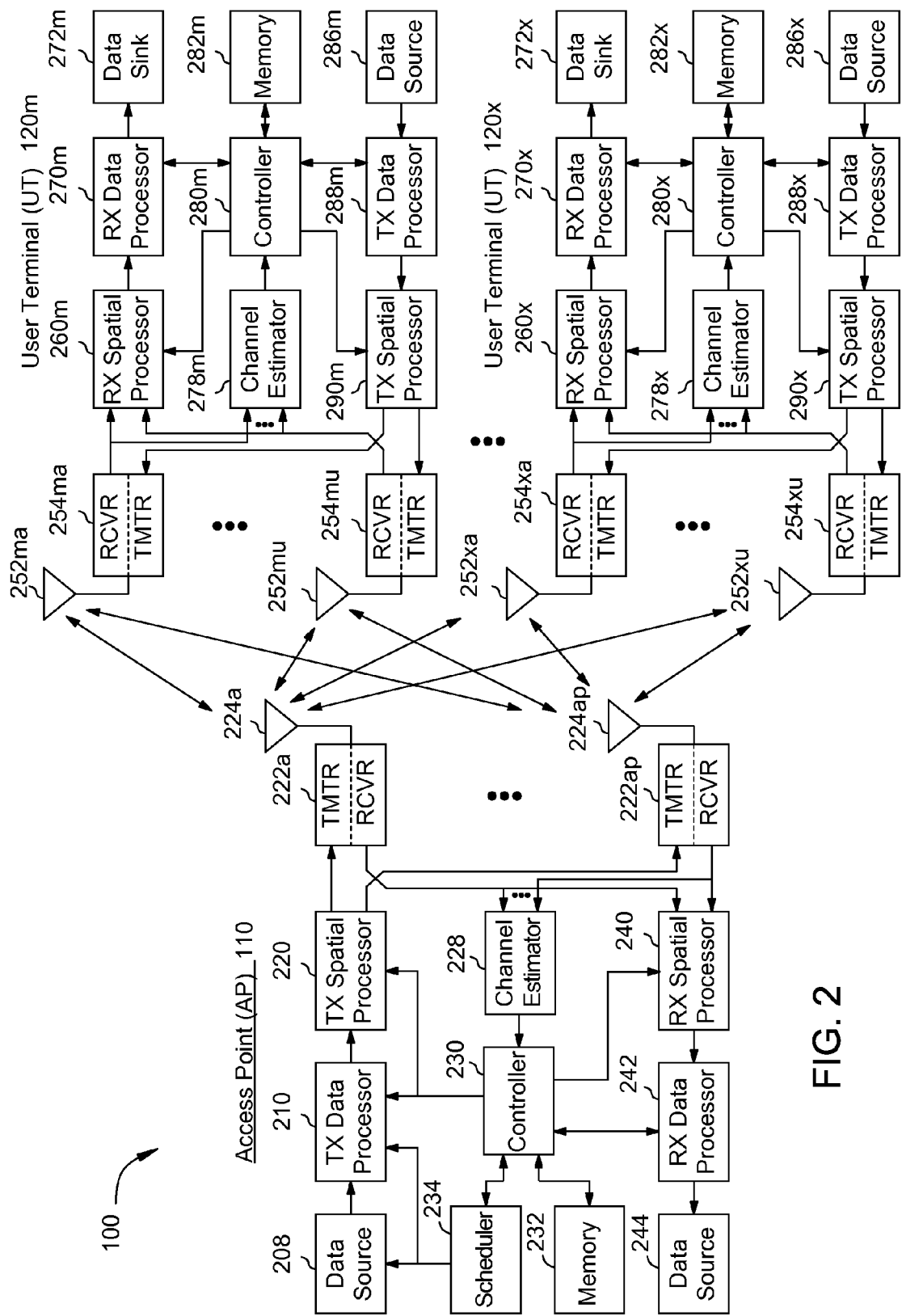
FIG. 2 illustrates a block diagram of an access point and a plurality of user terminals in accordance with certain aspects of the present disclosure.

FIG. 2 shows a block diagram of access point 110 and two user terminals 120m and 120x in MIMO system 100. Access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
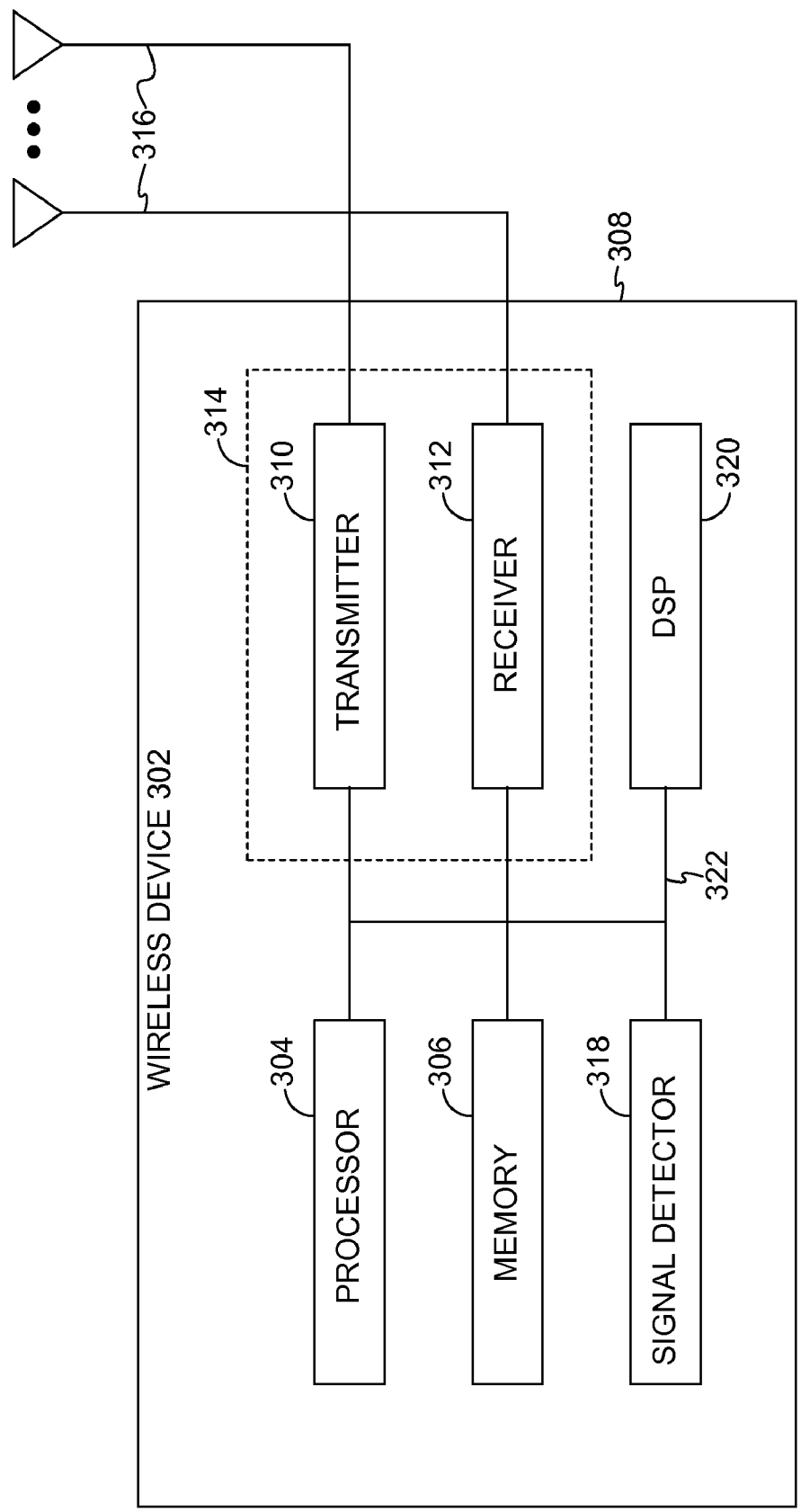
FIG. 3 illustrates various components that may be utilized in a wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In the SDMA system 100, the access point 110 can send traffic data and control information on the downlink to a user terminal 120. The control information may be typically sent on control channels and may convey a downlink assignment, an uplink assignment, and/or other useful information for the user terminal 120. For example, the information conveyed by a physical downlink control channel (PDCCH) includes: a resource blocks (RB) assignment, a transmit power control (TPC) command for a physical uplink control channel (PUCCH), a hybrid automatic repeat-request (HARQ) process number, a HARQ swap flag, precoding information, precoding confirmation, modulation and coding scheme, new data indicator, and redundancy version.

For both uplink and downlink operations of the SDMA system 100, a number of required PDCCHs equals to a number of user terminals 120 that share the same resources. Since the resource allocations for user terminals 120 in the SDMA system 100 are identical, certain benefits may be achieved if all user terminals 120 that share same resources of the SDMA system 100 utilize only one PDCCH. For example, the overall PDCCH overhead may be reduced due to a smaller number of required PDCCH in the SDMA system 100.

Control Information for Multiple User Terminals Transmitted Over Common PDCCH

Figure 4:
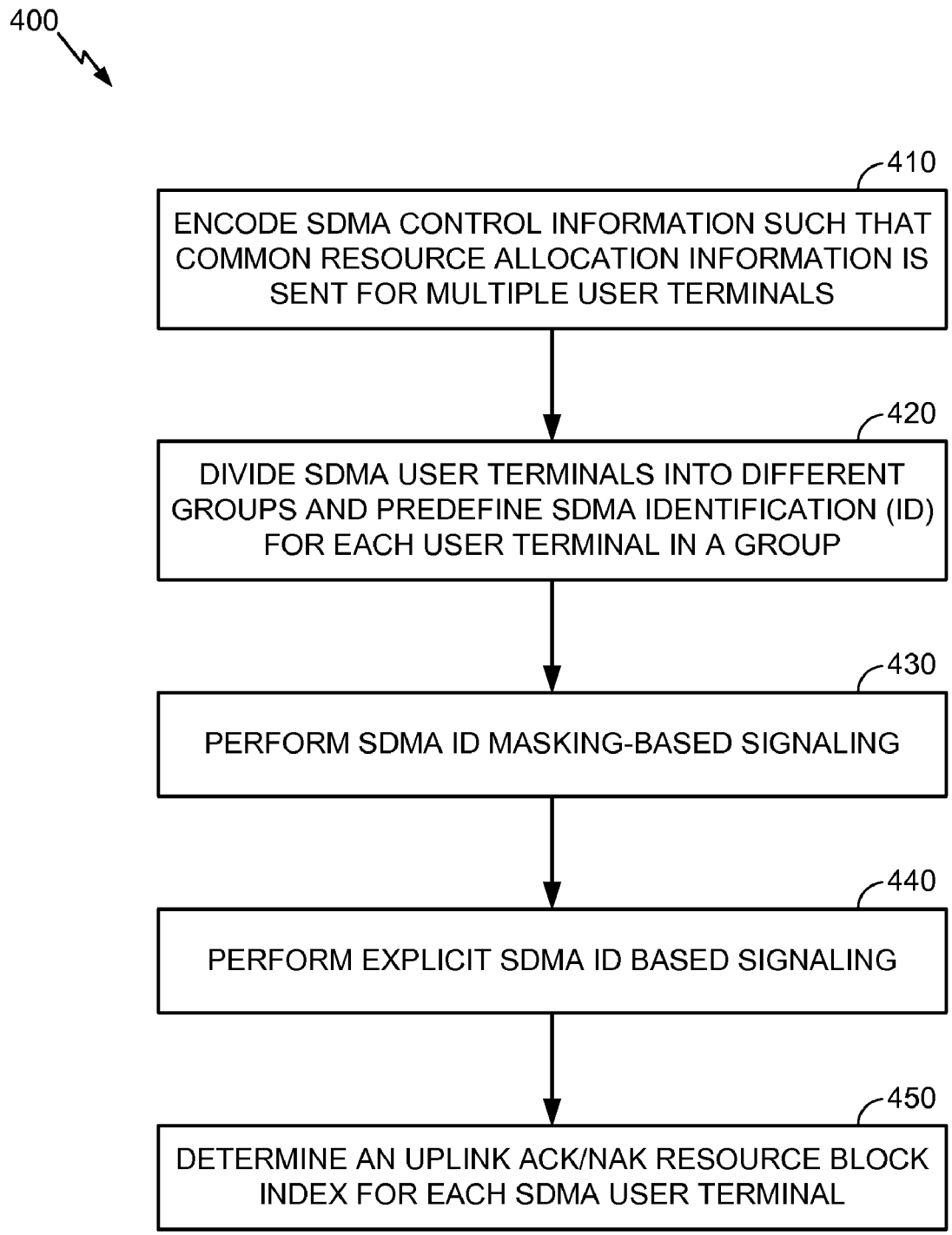
FIG. 4 illustrates operations for sending control information to multiple user terminals sharing a Physical Downlink Control Channel (PDCCH) in a Spatial Division Multiple Access (SDMA) wireless system in accordance with certain aspects of the present disclosure.

Certain aspects of the present disclosure support a method to allow multiple SDMA users to share one PDCCH. FIG. 4 illustrates operations 400 for sending control information to multiple user terminals over a single PDCCH of an SDMA wireless system.

At 410, control information may be encoded such that resource allocation information may be sent once for multiple user terminals that share the same resources. An SDMA control channel search space may be also predefined. In one aspect of the present disclosure, the SDMA control information may be placed in a common search space. In another aspect of the present disclosure, the SDMA control information may be placed in a dedicated location in order to reduce computational complexity of a control channel blind decoding.

At 420, SDMA user terminals may be divided into different groups, and SDMA Identifications (IDs) may be predefined. Each user terminal in a group of user terminals may have a unique ID in that group. The SDMA grouping and/or an SDMA ID assigned to each user terminal may vary from time to time in a predefined pattern. Furthermore, a Media Access Control (MAC) ID may be divided into at least two different groups of user terminals. Groups of MAC IDs may be reserved for SDMA purposes. Other MAC IDs may be utilized for non-SDMA user terminals.

At 430, SDMA ID masking-based signaling may be performed. A Cyclic Redundancy Check (CRC) field of the control information may be masked by applying different combination of IDs of SDMA user terminals. The CRC length may be larger than a nominal length of 16 bits in order to reduce a probability of false alarm event resulting from the masking operation.

At 440, an explicit SDMA ID based signaling may be performed. A SDMA Cell Radio Network Temporary Identifier (C-RNTI) may be assigned for a group of SDMA user terminals. Either all SDMA IDs may be explicitly signaled or indications sharing the same resource inside the control information may be signaled. SDMA user terminal may need to decode the control information and to look for its ID. A location of the user ID may determine a codeword order or an order of layers for each user terminal.

At 450, an uplink acknowledge/negative acknowledge (ACK/NAK) resource block (RB) index may be determined for each SDMA user terminal. A first Control Channel Element (CCE) of the PDCCH and the SDMA ID may determine the ACK/NAK RB index of a user terminal. Each SDMA user terminal may have a unique RB index.

Certain aspects of the present disclosure support joint encoding of information for multiple user terminals inside the PDCCH control message. A pre-coding matrix indicator (PMI) may need to be transmitted to each SDMA user terminal. The PMI of a subset of user terminals may be signaled. Combination of multiple PMIs may be also encoded in order to achieve that a smaller number of bits are used to address a subset of all allowed PMI combinations. For certain aspects of the present disclosure, differential encoding may be applied to modulation and coding schemes and to redundancy version information for multiple SDMA user terminals. At a receiver side of a communication link, a user terminal may utilize the PMI for itself as well as the PMI for other user terminals that share the same resource elements in order to improve the receiver performance.

User terminals may share the same resources of the SDMA wireless system. As previously specified, for certain aspects of the present disclosure a PDCCH control message may be encoded jointly for a plurality of SDMA user terminals. Furthermore, only one resource assignment may be sent within the PDCCH control message for all SDMA user terminals.

For certain aspects of the present disclosure, the SDMA user terminals may be divided into subgroups, and user terminals from the same subgroup may be encoded jointly. Therefore, only one resource assignment may be sent within the control message for each subgroup. Furthermore, for certain aspects of the present disclosure, a common SDMA control channel search space may be predefined and the dedicated control resource (e.g., the shared PDCCH) may be located in the common SDMA control channel search space.

For certain aspects of the present disclosure, a dedicated control resource may be allocated for each group of SDMA user terminals. Each user terminal in a group can share the allocated control resource with another user terminal from the same group. The SDMA user terminals that belong to a particular group may only search the control space that is allocated to this group. For certain aspects of the present disclosure the dedicated control resource (e.g., the shared PDCCH) may be placed in the common search space.

Figure 5:
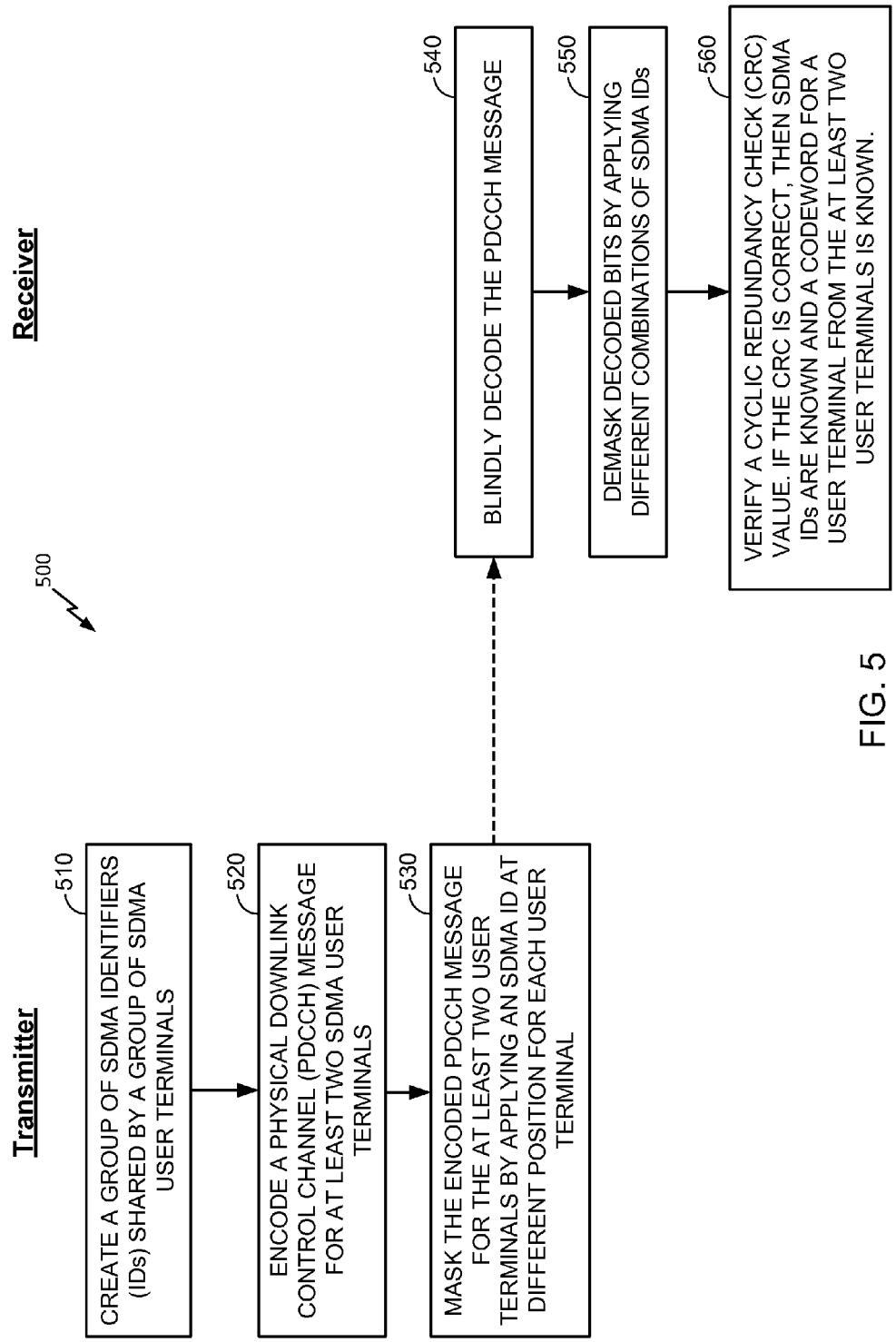
FIG. 5 illustrates operations for SDMA Identification (ID) masking-based signaling in accordance with certain aspects of the present disclosure.

FIG. 5 illustrates operations 500 for SDMA Identification (ID) masking-based signaling of a control message transmitted over a shared PDCCH for a plurality of user terminals. Operations 510-530 may be performed at a transmitter side of the SDMA system (e.g., at an access point), and operations 540-560 may be performed at a receiver side of the SDMA system (e.g., at a user terminal).

At 510, a group of SDMA IDs G(n), n=0, 1, ..., N−1 may be created. These specific SDMA IDs may be shared by a group of SDMA user terminals. SDMA IDs within the same group may represent common information and may be signaled by the network layer-3 message. An SDMA ID may be assigned to a particular SDMA user terminal when the user terminal is configured as a multi-user (MU) MIMO user terminal. The assigned SDMA ID can vary from time to time with a predefined pattern for the particular SDMA user terminal. The SDMA IDs may not be conveyed if they are already defined.

The length of each SDMA ID within the group can be L (i.e., the length of arbitrary G(n) can be L). Therefore, up to $2^L$ user terminals may be supported. A subset of SDMA IDs may be used, and it can be assumed that the size of subset is Q (i.e., a number of user terminals in the subset is equal to Q), where $Q \leq 2^L$. One ID within the group may be reserved for no pairing of user terminals. The corresponding SDMA user terminal may be addressed by one of the previously defined PDCCH formats.

At 520, PDCCH control information may be encoded, for example, for a pair of arbitrary SDMA user terminals u and v. It is to be understood that "a pair of SDMA user terminals" is only an exemplary case as the PDCCH control information may be encoded for more than two SDMA user terminals. Information bits may be represented as:

$$a(0), a(1), \ldots, a(R-1), \quad (1)$$

where R is a total number of information bits. 16-bit Cyclic Redundancy Check (CRC) field may be represented as:

$$c(0), c(1), \ldots, c(15), \quad (2)$$

and it may be based on information bits given by equation (1). The PDCCH control message A comprising information bits from equation (1) and the CRC field from equation (2) may be represented as:

$$A = [a(0), a(1), \ldots, a(R-1), c(0), c(1), \ldots, c(15)] \quad (3)$$

Figure 6:
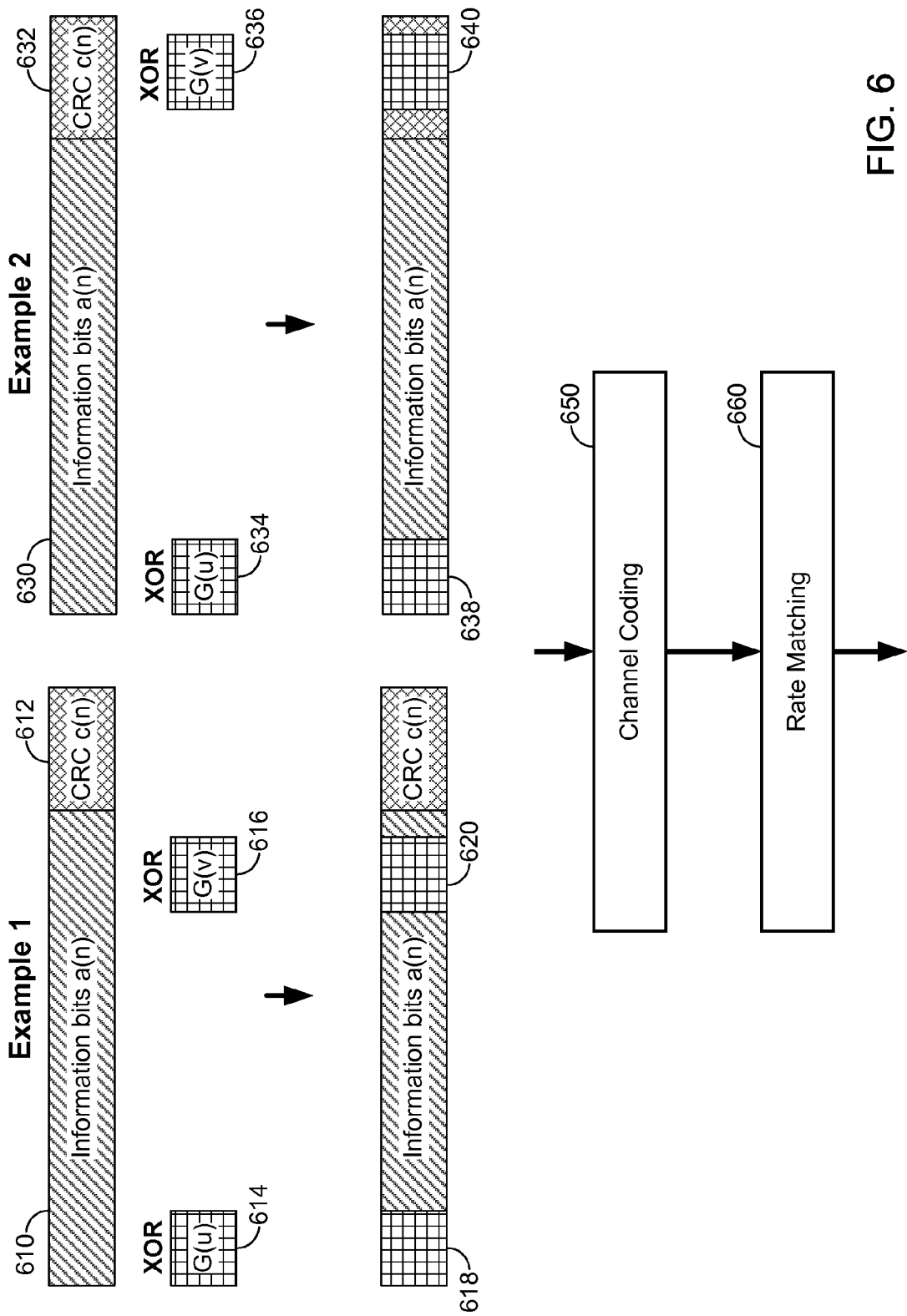
FIG. 6 illustrates examples of SDMA ID masking in accordance with certain aspects of the present disclosure.

At 530, the encoded PDCCH control message may be masked by applying SDMA IDs G(u) and G(v) at different positions of the control sequence defined by equation (3). FIG. 6 illustrates two examples of SDMA ID masking in accordance with certain aspects of the present disclosure.

In the first example of the SDMA ID masking, first L information bits of an information sequence 610 may be masked by an SDMA ID G(u) 614 to generate masked information bits 618, and some other L bits of the information sequence 610 may be masked by an SDMA ID G(v) 616 to generate masked information bits 620. The SDMA ID G(u) may imply the first codeword, and the SDMA ID G(v) may correspond to the second codeword, or vice-versa. A CRC field 612 may represent a preferred location for both G(u) and G(v) IDs.

In the second example of the SDMA ID masking also illustrated in FIG. 6, first L information bits of an information sequence 630 may be masked by an SDMA ID G(u) 634 to generate masked information bits 638. A CRC field 632 may be masked by an SDMA group ID G(v) 636 (which may be one of unused user MAC IDs) to generate a masked CRC field 640. If masking is performed within a CRC field, then the SDMA system may reserve some user MAC IDs that are not used by non-SDMA user terminals. The length of CRC field for SDMA PDCCH may be increased compared to a length of CRC field of a nominal control PDCCH used for non-SDMA user terminals. Channel coding 650 and rate matching 660 may follow the SDMA ID masking operation before transmitting the control message over the PDCCH that is shared by a plurality of user terminals.

At 540, once the masked control message is received at a user terminal, the control message may be blindly decoded since the user terminal does not know if the received control message comprises information related to that specific user terminal. Following that, at 550, decoded bits may be de-masked by applying different combinations of G(n) pairs. At 560, a value of the CRC field may be verified. If the value of CRC is correct for one pair of G(n), then G(u) and G(v) may be known and, therefore, the codeword for the user terminal may also be known.

There may be $$\binom{Q}{2}$$

total de-masking combinations since two out of Q SDMA IDs may be chosen assuming at most two user terminals can be paired for the same resource. Computational complexity of the de-masking process may be simplified if combinations of paired user terminals are restricted, or if multiple groups of SDMA user terminals are created.

De-masking and verification of the CRC value may be fairly simple to implement at the user terminal. However, the masking operation may increase a false alarm rate for a blind decoding of the PDCCH control information. Because of that, the SDMA system may employ a longer CRC field for the SDMA PDCCH relative to the CRC length of the nominal PDCCH for the non-SDMA user terminals.

Uplink Acknowledge/Negative Acknowledge (ACK/NAK) resource may be typically determined by a first Control Channel Element (CCE) index of a corresponding PDCCH. However, with one PDCCH addressing multiple SDMA user terminals, the uplink ACK/NACK resource may need to be modified accordingly. For certain aspects of the present disclosure, the uplink ACK/NAK resource may be determined based on the first CCE index of the PDCCH and based on the SDMA IDs G(n), n=0, 1, ..., N−1. These mappings should be unique considering both SDMA user terminals and non-SDMA user terminals.

The following information may be required for a PDCCH to address multiple downlink SDMA user terminals. A resource allocation header for resource allocation type 0 or type 1 may be one bit long. For the resource allocation type 0, $\lceil N_{RB}^{DL}/P \rceil$ bits of a resource block (RB) assignment field may provide the resource allocation. For the resource allocation type 1, $\lceil \log_2(P) \rceil$ bits of the RB assignment field may be used as a header that is specific to this resource allocation type in order to indicate a subset of selected resource blocks. One bit of the RB assignment field may indicate a shift of a resource allocation span. Therefore, a total of $(\lceil N_{RB}^{DL}/P \rceil - \lceil \log_2(P) \rceil - 1)$ bits may provide the resource allocation. Value of parameter P may depend on a number of downlink (DL) resource blocks.

A Transmit Power Control (TPC) command for the PUCCH may be 2·N bits long, where N is a number of SDMA user terminals sharing the same resource elements. A hybrid automatic repeat-request (HARQ) process number may occupy 3·N bits in the case of Frequency Division Duplex (FDD) systems, and may occupy 4·N bits for Time Division Duplex (TDD) systems. Furthermore, a HARQ swap flag may comprise 1·N bits, and the pre-coding information together with the pre-coding confirmation may occupy x N bits. For each codeword, a modulation and coding scheme may occupy five bits, a new data indicator may be one bit long, and a redundancy version may be two bits long.

Figure 4A:
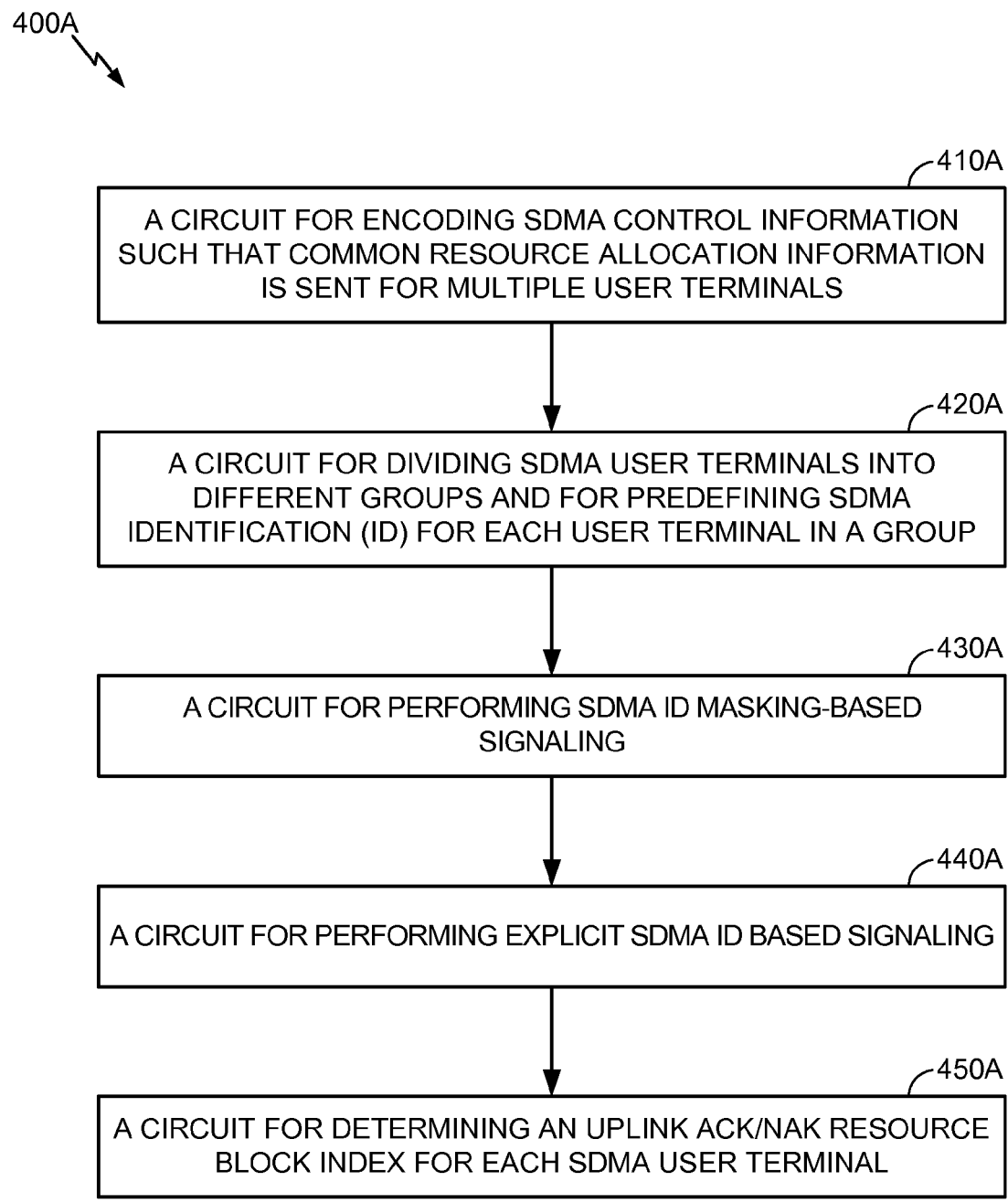
FIG. 4A illustrates example components capable of performing the operations illustrated in FIG. 4.
Figure 5A:
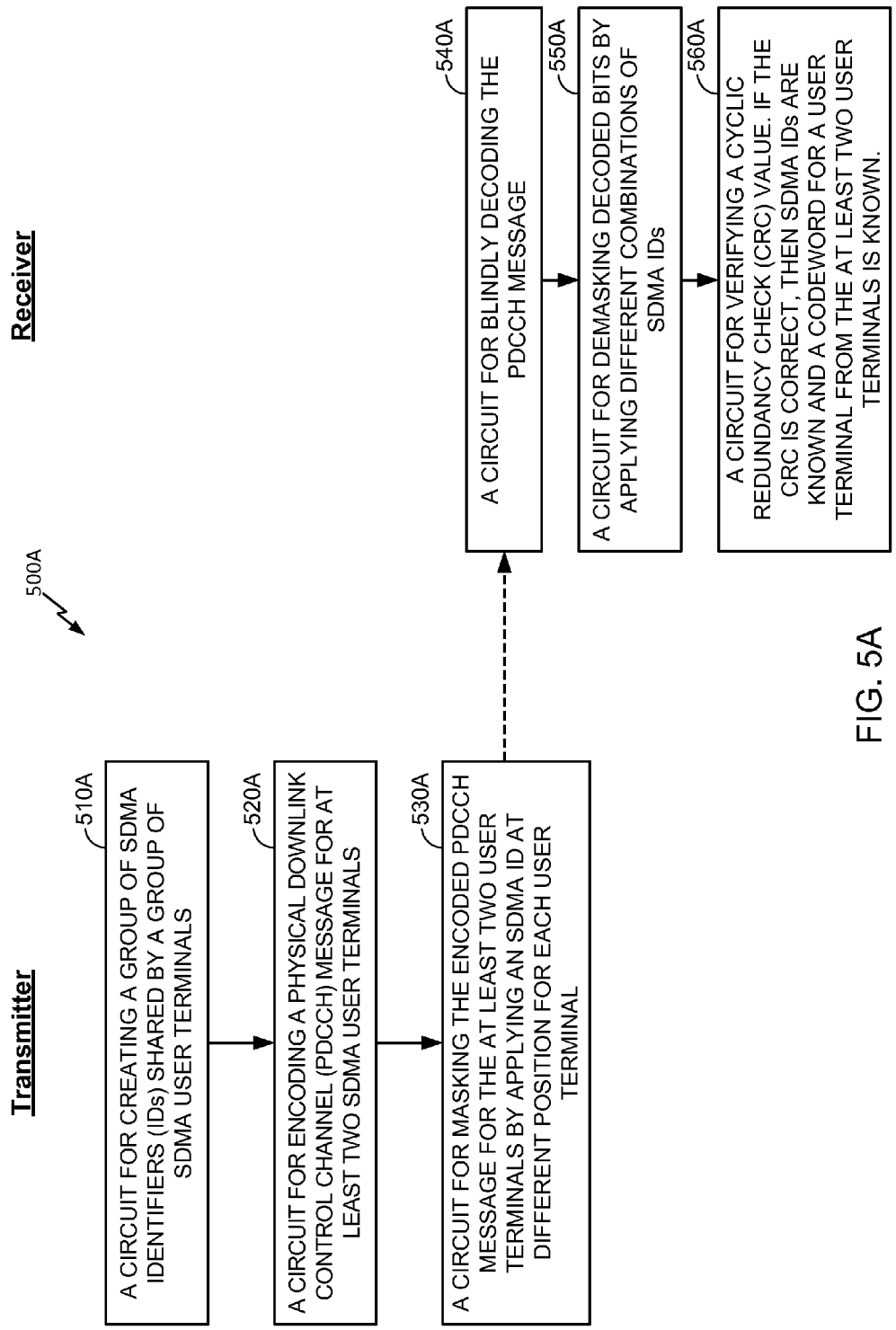
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 410-450 and blocks 510-560 illustrated in FIG. 4 and FIG. 5 correspond to circuit blocks 410A-450A and 510A-560A illustrated in FIG. 4A and FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in a base station, a mobile handset, or other type of wireless devices with processing logic and elements to perform the techniques provided herein.

What is claimed is:

1. A method for wireless communications, comprising:
dividing a plurality of user terminals into at least one group of user terminals that share a common spatial division multiple access (SDMA) physical downlink control channel (PDCCH);
defining an SDMA Identification (ID) for each user terminal in the group;
performing a masking function to a portion of a message including control information for at least two of the plurality of user terminals by applying the SDMA IDs for the at least two of the plurality of user terminals;
assigning a Cell Radio Network Temporary Identifier (C-RNTI) to the group of user terminals; and
transmitting the C-RNTI within the message and transmitting the message over the common PDCCH.

2. The method of claim 1, wherein the portion of the message includes a Cyclic Redundancy Check (CRC) field.

3. The method of claim 1, further comprising:
allocating the PDCCH in a control channel search space by locating the control information in a common search space.

4. The method of claim 1, further comprising:
determining an uplink Acknowledgement (ACK)/Non-ACK (NAK) Resource Block (RB) index for each user terminal based on a first Control Channel Element (CCE) of the control information and based on the SDMA ID of each user terminal.

5. The method of claim 1, wherein the control information includes a pre-coding matrix indicator (PMI) for a subset of user terminals.

6. The method of claim 1, wherein one SDMA ID in the group is reserved for no pairing of user terminals.

7. A method for wireless communications, comprising:
receiving a control message over a spatial division multiple access (SDMA) physical downlink control channel (PDCCH) shared by a group of user terminals, wherein the control message includes control information for at least two of the user terminals in the group identified by SDMA Identifications (IDs);
determining if the control message includes control information for the user terminal at least in part by de-masking the control message by applying different sets of two or more SDMA Identifiers (IDs) corresponding to different sets of user terminals to at least a portion of the control message;
ignoring the message, if the control message does not include control information for the user terminal; and
extracting the control information from the message, if the control message includes control information for the user terminal;
wherein one SDMA ID in the group is reserved for no pairing of user terminals.

8. The method of claim 7, wherein the portion of the control message includes a Cyclic Redundancy Check (CRC) field of the control message.

9. An apparatus for wireless communications, comprising:
a device for dividing a plurality of user terminals into at least one group of user terminals that share a common spatial division multiple access (SDMA) physical downlink control channel (PDCCH);
a device for defining an SDMA Identification (ID) for each user terminal in the group;
a device for performing a masking function to a portion of a message including control information for at least two of the plurality of user terminals by applying the SDMA IDs for the at least two of the plurality of user terminals;
a device for assigning a Cell Radio Network Temporary Identifier (C-RNTI) to the group of user terminals; and
a transmitter for transmitting the C-RNTI within the message and a transmitter for transmitting the message over the common PDCCH.

10. The apparatus of claim 9, wherein the portion of the message includes a Cyclic Redundancy Check (CRC) field.

11. The apparatus of claim 9, further comprising:
an allocator for allocating the PDCCH in a control channel search space by locating the control information in a common search space.

12. The apparatus of claim 9, further comprising:
a circuit for determining an uplink Acknowledgement (ACK)/Non-ACK (NAK) Resource Block (RB) index for each user terminal based on a first Control Channel Element (CCE) of the control information and based on the SDMA ID of each user terminal.

13. The apparatus of claim 9, wherein the control information includes a pre-coding matrix indicator (PMI) for a subset of user terminals.

14. The apparatus of claim 9, wherein one SDMA ID in the group is reserved for no pairing of user terminals.

15. An apparatus for wireless communications, comprising:
a receiver for receiving a control message over a spatial division multiple access (SDMA) physical downlink control channel (PDCCH) shared by a group of user terminals, wherein the control message includes control information for at least two of the user terminals in the group identified by SDMA Identifications (IDs);
a device for determining if the control message includes control information for the user terminal at least in part by de-masking the control message by applying different sets of two or more SDMA Identifiers (IDs) corresponding to different sets of user terminals to a portion of the control message;
a circuit for ignoring the message, if the control message does not include control information for the user terminal; and
an extractor for extracting the control information from the message, if the control message includes control information for the user terminal;
wherein one SDMA ID in the group is reserved for no pairing of user terminals.

16. The apparatus of claim 15, wherein the portion of the control message includes a Cyclic Redundancy Check (CRC) field of the control message.

17. An apparatus for wireless communications, comprising:
means for dividing a plurality of user terminals into at least one group of user terminals that share a common spatial division multiple access (SDMA) physical downlink control channel (PDCCH);
means for defining an SDMA Identification (ID) for each user terminal in the group;
means for performing a masking function to a portion of a message including control information for at least two of the plurality of user terminals by applying the SDMA IDs for the at least two of the plurality of user terminals;
means for assigning a Cell Radio Network Temporary Identifier (C-RNTI) to the group of user terminals;
means for transmitting the C-RNTI within the message and for transmitting the message over the common PDCCH.

18. The apparatus of claim 17, wherein the portion of the message includes a Cyclic Redundancy Check (CRC) field.

19. The apparatus of claim 17, further comprising:
means for allocating the PDCCH in a control channel search space by locating the control information in a common search space.

20. The apparatus of claim 17, further comprising:
means for determining an uplink Acknowledgement (ACK)/Non-ACK (NAK) Resource Block (RB) index for each user terminal based on a first Control Channel Element (CCE) of the control information and based on the SDMA ID of each user terminal.

21. The apparatus of claim 17, wherein the control information includes a pre-coding matrix indicator (PMI) for a subset of user terminals.

22. The apparatus of claim 17, wherein one SDMA ID in the group is reserved for no pairing of user terminals.

23. An apparatus for wireless communications, comprising:
means for receiving a control message over a spatial division multiple access (SDMA) physical downlink control channel (PDCCH) shared by a group of user terminals, wherein the control message includes control information for at least two of the user terminals in the group identified by SDMA Identifications (IDs);
means for determining if the control message includes control information for the user terminal at least in part by de-masking the control message by applying different sets of two or more SDMA Identifiers (IDs) corresponding to different sets of user terminals to a portion of the control message;
means for ignoring the message, if the control message does not include control information for the user terminal; and
means for extracting the control information from the message, if the control message includes control information for the user terminal;
wherein one SDMA ID in the group is reserved for no pairing of user terminals.

24. The apparatus of claim 23, wherein the portion of the control message includes a Cyclic Redundancy Check (CRC) field of the control message.

25. A computer-program product for wireless communications, comprising a non-transitory computer-readable medium encoded with instructions executable to:
divide a plurality of user terminals into at least one group of user terminals that share a common spatial division multiple access (SDMA) physical downlink control channel (PDCCH);
define an SDMA Identification (ID) for each user terminal in the group;
perform a masking function to a portion of a message including control information for at least two of the plurality of user terminals by applying the SDMA IDs for the at least two of the plurality of user terminals;
assign a Cell Radio Network Temporary Identifier (C-RNTI) to the group of user terminals; and
transmit the C-RNTI within the message and transmit the message over the common PDCCH.

26. The computer-program product of claim 25, wherein the portion of the message includes a Cyclic Redundancy Check (CRC) field.

27. A computer-program product for wireless communications, comprising a non-transitory computer-readable medium encoded with instructions executable to:
receive a control message over a spatial division multiple access (SDMA) physical downlink control channel (PDCCH) shared by a group of user terminals, wherein the control message includes control information for at least two of the user terminals in the group identified by SDMA Identifications (IDs);
determine if the control message includes control information for the user terminal at least in part by de-masking the control message by applying different sets of two or more SDMA Identifiers (IDs) corresponding to different sets of user terminals to a portion of the control message;
ignore the message, if the control message does not include control information for the user terminal; and
extract the control information from the message, if the control message includes control information for the user terminal;
wherein one SDMA ID in the group is reserved for no pairing of user terminals.

28. The computer-program product of claim 27, wherein the portion of the control message includes a Cyclic Redundancy Check (CRC) field of the control message.

29. A method for wireless communications, comprising:
dividing a plurality of user terminals into at least one group of user terminals that share a common spatial division multiple access (SDMA) physical downlink control channel (PDCCH);
defining an SDMA Identification (ID) for each user terminal in the group;
transmitting a message including control information for at least two of the user terminals in the group over the common PDCCH, wherein the at least two user terminals are identified by their SDMA ID; and
determining an uplink Acknowledgement (ACK)/Non-ACK (NAK) Resource Block (RB) index for each user terminal based on a first Control Channel Element (CCE) of the control information and based on the SDMA ID of each user terminal.

30. The method of claim 29, further comprising performing a masking function to a portion of the message by applying the SDMA IDs for the at least two of the plurality of user terminals.

31. A method for wireless communications, comprising:
receiving a control message over a spatial division multiple access (SDMA) physical downlink control channel (PDCCH) shared by a group of user terminals, wherein the control message includes control information for at least two of the user terminals in the group identified by SDMA Identifications (IDs);
determining if the control message includes control information for the user terminal;
ignoring the message, if the control message does not include control information for the user terminal;
extracting the control information from the message, if the control message includes control information for the user terminal; and
determining an uplink Acknowledgement (ACK)/Non-ACK (NAK) Resource Block (RB) index for the user terminal based on a first Control Channel Element (CCE) of the control information and based on the SDMA ID of the user terminal, if the control message includes control information for the user terminal.

32. The method of claim 31, wherein the determining if the control message includes control information for the user terminal includes de-masking the control message by applying different sets of two or more SDMA Identifiers (IDs) corresponding to different sets of user terminals to at least a portion of the control message.

33. An apparatus for wireless communications, comprising:
- a device for dividing a plurality of user terminals into at least one group of user terminals that share a common spatial division multiple access (SDMA) physical downlink control channel (PDCCH);
- a device for defining an SDMA Identification (ID) for each user terminal in the group;
- a transmitter for transmitting a message including control information for at least two of the user terminals in the group over the common PDCCH, wherein the at least two user terminals are identified by their SDMA ID; and
- a circuit for determining an uplink Acknowledgement (ACK)/Non-ACK (NAK) Resource Block (RB) index for each user terminal based on a first Control Channel Element (CCE) of the control information and based on the SDMA ID of each user terminal.

34. The apparatus of claim 33, further comprising a device for performing a masking function to a portion of the message by applying the SDMA IDs for the at least two of the plurality of user terminals.

35. An apparatus for wireless communications, comprising:
- a receiver for receiving a control message over a spatial division multiple access (SDMA) physical downlink control channel (PDCCH) shared by a group of user terminals, wherein the control message includes control information for at least two of the user terminals in the group identified by SDMA Identifications (IDs);
- a device for determining if the control message includes control information for the user terminal;
- a circuit for ignoring the message, if the control message does not include control information for the user terminal;
- an extractor for extracting the control information from the message, if the control message includes control information for the user terminal; and
- a circuit for determining an uplink Acknowledgement (ACK)/Non-ACK (NAK) Resource Block (RB) index for the user terminal based on a first Control Channel Element (CCE) of the control information and based on the SDMA ID of the user terminal, if the control message includes control information for the user terminal.

36. The apparatus of claim 35, wherein the device for determining if the control message includes control information for the user terminal de-masks the control message by applying different sets of two or more SDMA Identifiers (IDs) corresponding to different sets of user terminals to at least a portion of the control message.

* * * * *